United States Patent [19]

Mizogami et al.

[11] Patent Number: 4,518,751
[45] Date of Patent: May 21, 1985

[54] PROCESS FOR THE PRODUCTION OF POLYETHYLENE

[75] Inventors: Shigeyoshi Mizogami; Shinichi Akimoto, both of Sodegaura, Japan

[73] Assignee: Idemitsu Kosan Company Limited, Tokyo, Japan

[21] Appl. No.: 270,858

[22] Filed: Jun. 5, 1981

[51] Int. Cl.$^3$ .................... C08F 4/02; C08F 10/02
[52] U.S. Cl. .................... 526/114; 502/113; 502/119; 526/119; 526/352
[58] Field of Search .................... 326/114, 119

[56] References Cited

U.S. PATENT DOCUMENTS

| | | | |
|---|---|---|---|
| 4,109,071 | 8/1978 | Berger et al. | 526/114 |
| 4,226,964 | 10/1980 | Tanaka et al. | 526/114 |
| 4,239,650 | 12/1980 | Franke et al. | 526/127 |
| 4,255,544 | 3/1981 | Kimura et al. | 526/127 |
| 4,260,723 | 4/1981 | Harada et al. | 526/114 |

*Primary Examiner*—Edward J. Smith
*Attorney, Agent, or Firm*—Frishauf, Holtz, Goodman & Woodward

[57] ABSTRACT

A process for the production of polyethylene having a wide molecular weight distribution and good molding and good physical properties. It is produced using a catalyst consisting of components (A) and (B). Component (A) is a solid product prepared by reacting (i) the reaction product of a compound containing titanium, magnesium and halogen, and (ii) at least one compound selected from the group consisting of tetraalkoxyzirconium, zirconium tetrahalide and tetraalkoxytitanium, with an organoaluminum halide compound of the general formula: $AlR^1_n X^1_{3-n}$ wherein $R^1$ is an alkyl group, $X^1$ is a halogen atom, and $0 < n < 3$ or a halogen-containing titanium compound of the general formula $Ti(OR^2)_m X^2_{4-m}$, wherein $R^2$ is an alkyl group, $X^2$ is a halogen atom, and $0 \leq m < 4$. Component (B) is an organoaluminum compound.

11 Claims, No Drawings

PROCESS FOR THE PRODUCTION OF POLYETHYLENE

BACKGROUND OF THE INVENTION

The present invention relates to a process for the production of polyethylene and more particularly to an efficient process for the production of polyethylene having a broad distribution of molecular weight by the use of a specific catalyst.

Polyethylene has been widely used as an excellent synthetic resin in various applications and in particular, polyethylene having a broad distribution of molecular weight has been desired in view of moldability, physical properties of molded article, etc.

It is known that polyethylene for the production of a catalyst prepared by reacting a magnesium compound and a titanium halide has a higher activity than the so-called Ziegler catalyst polyethylene. In accordance with the conventional methods of production, if the distribution range of molecular weight of the product polyethylene is sufficiently broad, the catalyst activity will be low. These conventional methods are disadvantageous in that the production efficiency is low and since a large amount of catalyst is required, it is necessary to provide an operation for removal of the catalyst from the polyethylene products.

An object of the invention is to provide an efficient process for the production of polyethylene having a broad distribution of molecular weight by the use of a catalyst having high activity.

Another object of the invention is to provide a process for the production of polyethylene which does not require a de-ash step (i.e., a step of removing the catalyst).

A further object of the invention is to provide a process for the production of polyethylene having a large apparent density, a relatively uniform particle size, and a very low content of fine powder.

SUMMARY OF THE INVENTION

The present invention provides a process for the production of polyethylene which comprises polymerizing ethylene in the presence of a catalyst containing the following Components (A) and (B) as effective components:

(A) a solid product prepared by reacting (i) a solid material comprising the reaction product of (a) a compound containing at least titanium, magnesium and halogen, and (b) at least one compound selected from the group consisting of tetraalkoxyzirconium, zirconium tetrahalide and tetraaalkoxytitanium, with (ii) (a) an organoaluminum halide represented by the general formula $AlR^1_n X^1_{3-n}$ (wherein $R^1$ is an alkyl group, $X^1$ is a halogen atom, and $0 < n < 3$) or (b) a halogen-containing titanium compound represented by the general formula $Ti(OR^2)_m X^2_{4-m}$ wherein $R^2$ is an alkyl group, $X^2$ is a halogen atom, and $0 \leq m < 4$; and
(B) an organoaluminum compound.

DETAILED DESCRIPTION OF THE INVENTION

The catalyst for use in the process of the invention comprises Components (A) and (B) as described above.

With regard to the compound containing at least titanium, magnesium and halogen which is used for the preparation of Component (A), i.e., a solid product, there is no limitation thereto, and various compounds can be used. Suitable examples of the compounds containing at least titanium, magnesium and halogen include the following solid substances:

solid substances prepared by reacting inorganic magnesium compounds, such as magnesium oxide, magnesium hydroxide, magnesium carbonate, magnesium sulfate, and magnesium halide, with titanium halide;

solid substances prepared by reacting-dialkoxy-magnesium compounds with silicon halide, alcohol and titanium halide in that order;

solid substances prepared by reacting dialkoxymagnesium, e.g., magnesium diethoxide, with magnesium sulfate and titanium halide;

solid substances prepared by reacting precipitates which are formed by reacting Mg-O bond-containing inorganic compounds, such as magnesium oxide, magnesium hydroxide, and magnesium carbonate, with magnesium sulfate, silicon halide and alcohol in that order, with silicon halide or organosilicon compounds, e.g., $SiCl_4$, $CH_3OSiCl_3$, $(CH_3O)_2SiCl_2$, $(CH_3O)_3SiCl$, $Si(OCH_3)_4$, $C_2H_5OSiCl_3$, $(C_2H_5O)_2SiCl_2$, $(C_2H_5O)_3SiCl$ and $Si(OC_2H_5)_4$ and titanium halide; and solid substances prepared by reacting dialkoxymagnesium and an alcohol adduct of magnesium halide, such as $MgCl_2.6C_2H_5OH$ and treating the reaction product with alcohol, and then by reacting the reaction product thus treated with titanium halide.

The solid product, Component (A), is prepared by reacting the solid substance as prepared above, i.e., the compound containing at least titanium, magnesium and halogen, with at least one compound selected from the group consisting of tetraalkoxyzirconium, zirconium tetrahalide and tetraalkoxytitanium.

Examples of such tetraalkoxyzirconium compounds include tetramethoxyzirconium, tetraethoxyzirconium, tetrapropoxyzirconium and tetrabutoxyzirconium. Of these compounds, tetrabutoxyzirconium is particularly preferred. Examples of zirconium tetrahalide compounds include tetrachlorozirconium and tetrabromozirconium. Examples of tetraalkoxy titanium compounds include tetraethyoxytitanium and tetraisopropoxytitanium.

The solid product of Component (A) is usually prepared by reacting the compound containing at least titanium, magnesium and halogen with any one of tetraalkoxyzirconium, zirconium tetrahalide and tetraalkoxytitanium. When the compound is reacted with two or three compounds of tetraalkoxyzirconium, zirconium tetrahalide and tetraalkoxytitanium, the resulting catalyst effectively acts to produce polyethylene having a broader distribution of molecular weight and markedly improved physical properties.

The ratio of the compound containing at least titanium, magnesium and halogen to the compound or compounds selected from the group consisting of tetraalkoxytitanium, zirconium tetrahalide and tetraalkoxytitanium is not limited, and a suitable ratio is determined depending on the conditions employed. Usually, based on one mole of titanium atoms contained in the compound containing at least titanium, magnesium and halogen, tetraalkoxyzirconium is added within the range of about 0.1 to 20 moles, preferably about 0.2 to 10 moles, and zirconium tetrahalide or tetraalkoxytitanium are each added within the range of up to about 20 moles, preferably about 0.05 to 10 moles.

The foregoing reaction is carried out at a temperature of 0° C. to about 200° C., preferably about 20° C. to 150° C., for a period of about 5 minutes to 10 hours, preferably 30 minutes to 5 hours, and preferably, in an inert hydrocarbon solvent, such as pentane, hexane, heptane, oxtane, cyclohexane, benzene and toluene.

The thus prepared solid material is fully washed and then is reacted with the organoaluminum halide compound represented by the general formula: $AlR^1{}_nX^1{}_{3-n}$ or the halogen-containing titanium compound represented by the general formula: $Ti(OR^2)_mX^2{}_{4-m}$.

Of varius organoaluminum halide compounds represented by the foregoing general formula, dimethylaluminum monochloride, diethylaluminum monochloride, diisopropylaluminum monochloride, diisobutylaluminum monochloride, methylaluminum dichloride, ethylaluminum dichloride, isopropylaluminum dichloride, and isobutylaluminum dichloride, and mixtures thereof are preferred. Preferred examples of halogen-containing titanium compounds represented by the foregoing general formula include $TiCl_4$, $TiBr_4$, $Ti(OCH_3)Cl_3$, $Ti(OC_2H_5)_2Cl_2$, $Ti(OC_2H_5)_3Cl$, and mixtures thereof.

The amount of the organoaluminum halide compound or halogen-containing titanium compound added is usually determined within the range of about 1 to 200 moles, preferably about 10 to 100 moles, per mole of the titanium atom in the solid material described above.

The reaction of the solid material and the organoaluminum halide compound or halogen-containing titanium compound is performed under the conditions of a temperature of 0° to about 200° C., preferably about 30° to 150° C. and a reaction period of about 5 minutes to 10 hours, preferably about 30 minutes to 5 hours. The reaction can be performed either in an inert hydrocarbon solvent, such as pentane, hexane, heptane, octane, cyclohexane, benzene and toluene, or in a slurry state without the use of a solvent.

In the process of the invention, the solid product thus prepared is, if desired, washed and used as Component (A) of the catalyst.

Typical examples of organoaluminum compounds used as Component (B) which constitutes the catalyst for use in the process of the invention include those compounds represented by the general formula: $AlR^3{}_kX^3{}_{3-K}$ (wherein $R^3$ is an alkyl group, $X^3$ is a halogen atom, and $0 < k \leq 3$) and by the general formula: $AlR^4{}_i(OR^5)_{3-i}$ (wherein $R^4$ and $R^5$ are each an alkyl group and $0 < i \leq 3$). Suitable examples of such organoaluminum compounds include trimethylaluminum, triethylaluminum, triisopropylaluminum, triisobutylaluminum, diethylaluminum monochloride, diisopropylaluminum monochloride, diisobutylaluminum monochloride, dioctylaluminum monochloride, ethylaluminum dichloride, diethylaluminum monoethoxide, isopropylaluminum dichloride and ethylaluminum sesquichloride.

In accordance with the process of the invention, polyethylene is produced by polymerizing ethylene in the presence of the catalyst containing Components (A) and (B) as described hereinbefore as effective components. The ratio of Component (A) to Component (B) is not limited. Usually, Components (A) and (B) are mixed so that the aluminum atoms in Component (B) are about 1 to 1,000, preferably about 10 to 500 moles, per mole of the titanium atoms in Component (A). The amount of the catalyst comprising Component (A) and (B) used can be changed within wide limits and is determined depending on the conditions employed. Usually, it is used in an amount, calculated as the titanium atoms in the Component (A), of about 0.001 to 10 millimoles and preferably about 0.005 to 0.5 millimoles, per liter of the reaction system.

In producing polyethylene by polymerizing ethylene in accordance with the process of the invention, the catalyst prepared by using Components (A) and (B) is added to the reaction system and then ethylene is introduced thereinto. The procedure and conditions of the polymerization are not limited. Any of solution polymerization, suspension polymerization, gas phase polymerization, etc., can be employed. The polymerization can be performed either continuously or discontinuously. As media for the reaction system, inert solvents, such as butane, pentane, hexane, cyclohexane, heptane, benezene and toluene, are preferably used. The polymerization can be performed under the following conditions: ethylene pressure of about 2 to 100 $kg/cm^2$, preferably about 5 to 50 $kg/cm^2$; reaction temperature of about 20° C. to 200° C., preferably about 50° C. to 150° C., and a period of about 5 minutes to 10 hours, preferably about 30 minutes to 5 hours, to thereby produce the desired polyethylene. The regulation of the molecular weight in the polymerization can be carried out by a conventional method, e.g., by the use of hydrogen.

The term "polyethylene" as used herein includes copolymers of ethylene with a small amount of an α-olefin, as well as homopolymers of ethylene.

Some of the major advantages of the process of the invention follow:

(1) Since the catalyst for use in the process of the invention has high catalytic activity, sufficient effect can be obtained by using only a small amount of the catalyst. This permits omitting the step of removing the catalyst after the completion of polymerization.

(2) The polyethylene produced in accordance with the process of the invention has a large apparent density, a uniform particle size, and a very low content of fine powder, and furthermore a broad distribution range of molecular weight. Thus, the polyethylene has very good moldability and excellent physical properties.

(3) By appropriately determining the mixing ration of components in the catalyst used, polymerization conditions and so forth, the distribution range of molecular weight of the polyethylene can be controlled within the desired range. Thus, the process of the present invention is very effective.

The alkyl groups which are contained in the constituents of component (A) and component (B), e.g. tetraalkoxyzirconium, tetraalkoxytitanium, aluminum halide and titanium halide constituents of component (A) and of the organoaluminum compound of component (B), preferably contain from 1 to 10 carbon atoms and more preferably from 1 to 4 carbon atoms.

Chlorine and bromine are the preferred halogen constituents of the halide constituents of the catalyst.

EXAMPLES

The present invention is explained in greater detail with reference to the following examples and comparative examples. All reactions in the examples were carried out under an argon atmosphere. The distribution range of molecular weight of the polyethylene produced is evaluated by the melt flow ratio (F.R.), namely the ratio of melt index ($MI_{21.6}$) under a load of 21.6 kilograms to melt index ($MI_{2.16}$) under a load of 2.16 kilograms at 190° C.

EXAMPLE 1

(1) Preparation of compound containing at least titanium, magnesium and halogen A mixture of 150 milliliters of dried n-hexane, 10.0 grams (88 millimoles) of magnesium diethoxide, and 3.7 grams (22 millimoles) of silicon tetrachloride was introduced into a 500 milliliters four-necked flask. While stirring the mixture at 20° C., 2.0 grams (33 millimoles) of isopropyl alcohol was dropwise added thereto over the period of one hour, and subsequently they were reacted under reflux for two hours. Then, 42 grams (220 millimoles) of titanium tetrachloride was dropwise added to the reaction mixture, and the reaction was continued for an additional three hours under reflux with stirring. After the reaction was completed, the solid substance thus formed was washed with n-hexane to provide the desired compound containing titanium, magnesium and halogen. The titanium content of the compound was 5.8% by weight.

(2) Preparation of Component (A) of Catalyst

Into a 200 milliliters flask were introduced 50 milliliters of dried n-hexane, 8.8 millimoles, calculated as magnesium, (or 1.2 millimoles, calculated as titanium) of the compound as prepared in (1) above, and furthermore 5 millimoles of tetrabutoxyzirconium which were then reacted at 70° C. for 2 hours with stirring. The reaction mixture was cooled down and allowed to stand. The supernatant liquid formed was removed. The precipitate was washed once with 50 milliliters of n-hexane, and subsequently 2.2 millimoles of ethylaluminum dichloride was added thereto. They were reacted at 70° C. for 2 hours. The reaction mixture was cooled and then the precipitate formed was washed five times with 50 milliliters of n-hexane to provide the desired solid product of Component (A).

(3) Production of Polyethylene

A mixture of 400 milliliters of dried n-hexane, 2.0 millimoles of triisobutylaluminum as Component (B) and 0.0025 millimole, calculated as titanium, of the solid product of Component (A) as prepared in (2) above was introduced into a 1-liter stainless stell autoclave and the mixture was heated up to 80° C. Subsequently, hydrogen and ethylene were introduced under pressure into the autoclave so that hydrogen and ethylene partial pressures were 2 kilograms per square centimeter (kg/cm$^2$) and 6 kg/cm$^2$, respectively. Thereafter, while continuously introducing ethylene so as to maintain the foregoing partial pressure, polymerization of ethylene was conducted at 80° C. for 1 hour. At the end of the time, unreacted gases were removed and the polymer formed was separated and dried. Thus, 88.7 grams of white polyethylene was obtained.

The catalytic activity of the catalyst was 739 kilograms of polyethylene per gram of titanium atom per hour. The thus produced polyethylene had an apparent density of 0.25 gram per cubic centimeter (g/cm$^3$), MI$_{2.16}$ of 0.31 and F.R. of 52.

EXAMPLE 2

(1) Preparation of Component (A) of Catalyst

Into a 200 milliliters flask were introduced 8.8 millimoles, calculated as magnesium, (or 1.2 millimoles, calculated as titanium) of the compound prepared in (1) of Example 1, 2.0 millimoles of tetrabutoxyzirconium and 50 milliliters of dried n-hexane which were then reacted with 70° C. for 3 hours with stirring. Subsequently, 26.4 millimoles of ethylaluminum dichloride was added to the reaction mixture and reacted at 70° C. for 3 hours. After cooling the reaction mixture, the precipitate formed was washed five times with 50 milliliters of n-hexane to provide a solid product of Component (A).

(2) Preparation of Polyethylene

A mixture of 400 milliliters of dried n-hexane, 2 millimoles of triisobutylaluminum as Component (B), and 0.01 millimole, calculated as titanium, of the solid product of Component (A) as prepared in (1) above was introduced into a 1-liter stainless steel autoclave and the mixture was heated up to 80° C. Subsequently, hydrogen and ethylene were introduced under pressure into the autoclave so that hydrogen and ethylene partial pressures were 3 kg/cm$^2$ and 5 kg/cm$^2$, respectively. Thereafter, while continuously introducing ethylene so as to maintain the foregoing partial pressure, polymerization of ethylene was conducted at 80° C. for 1 hour. At the end of that time, unreacted gases were removed and the polymer formed was separated and dried. Thus, 92 grams of white polyethylene was obtained.

The apparent density of the polyethylene thus obtained was 0.25 g/cm$^3$, and MI$_{2.16}$ and F.R. were 0.30 and 65, respectively.

EXAMPLE 3

(1) Preparation of Component (A) of Catalyst

Into a 200 milliliters flask were introduced 8.8 millimoles, calculated as magnesium, (or 1.2 millimoles, calculated as titanium) of the compound as prepared in (1) of Example 1, 2.0 millimoles of tetrabutoxyzirconium, 2.0 millimoles of zirconium tetrachloride and 50 milliliters of dried n-hexane which were then reacted at 70° C. for 3 hours with stirring. Subsequently, 44 millimoles of ethylaluminum dichloride was added to the reaction mixture, and the reaction was continued at 70° C. for an additional two hours. The reaction mixture was cooled down and then was allowed to stand. The supernatant liquid formed was removed. The precipitate formed was washed five times with 50 milliliters of n-hexane to provide a solid product of Component (A).

(2) Production of Polyethylene

In the same manner as in Example 2, except that the solid product prepared in (1) above was used as Component (A), ethylene was polymerized to provide 83 grams of polyethylene.

The apparent density of the polyethylene thus formed was 0.25 g/cm$^3$, and MI$_{2.16}$ and F.R. were 0.13 and 69, respectively.

EXAMPLE 4

(1) Preparation of Component (A) of Catalyst

Into a 200 milliliters flask were introduced 8.8 millimoles, calculated as magnesium, (or 1.2 millimoles, calculated as titanium) of the compound prepared in (1) of Example 1, 2.0 millimoles of tetrabutoxyzirconium, 1.0 millimole of tetrabutoxytitanium, and 50 milliliters of dried n-hexane which were then reacted at 70° C. for 3 hours with stirring. Subsequently, 44 millimoles of ethylaluminum dichloride was added to the reaction mixture, and the reaction was continued at 70° C. for an additional two hours. The reaction mixture was cooled and was allowed to stand. The supernatant liquid formed was removed. The precipitate formed was washed five times with 50 milliliters of dried n-hexane to provide a solid product of Component (A).

(2) Production of Polethylene

In the same manner as in Example 2, except that the solid produce prepared in (1) above was used as Component (A), ethylene was polymerized to provide 66 grams of polyethylene.

The apparent density of the polyethylene thus produced was 0.26 g/cm$^3$, and $MI_{2.16}$ and F.R. were 0.43 and 60, respectively.

EXAMPLE 5

(1) Preparation of Component (A) of Catalyst

Into a 200 milliliters flask were introduced 8.8 millimoles, calculated as magnesium, (or 1.2 millimoles, calculated as titanium) of the compound prepared in (1) of Example 1, 2.0 millimoles of tetrabutoxyzirconium, 2.0 millimoles of zirconium tetrachloride, 1.0 millimole of tetrabutoxytitanium, and 50 milliliters of dried n-hexane which were then reacted at 70° C. for 3 hours with stirring. Subsequently, 44 millimoles of ethylaluminum dichloride was added to the reaction mixture, and the reaction was continued at 70° C. for an additional two hours. The reaction mixture was cooled down and was allowed to stand. The supernatant liquid formed was removed. The precipitate formed was washed five times with 50 milliliters of n-hexane to provide a solid product of Component (A).

(2) Production of Polyethylene

In the same manner as in Example 2, except that the solid product prepared in (1) above was used as Component (A), ethylene was polymerized to provide 79.5 grams of polyethylene.

The apparent density of the polyethylene thus produced was 0.25 g/cm$^3$, and $MI_{2.16}$ and F.R. were 0.25 and 63, respectively.

COMPARATIVE EXAMPLE 1

(1) Preparation of compound containing at least titanium, magnesium and halogen

A mixture of 150 milliliters of dried n-hexane, 10 grams (88 millimoles) of magnesium diethoxide and 42 grams (220 millimoles) of titanium tetrachloride was introduced into a 500 milliliters flask, and they were reacted under reflux for 3 hours. After the reaction was completed, the reaction mixture was cooled down and was allowed to stand. The supernatant liquid was removed. The precipitate formed was fully washed with n-hexane to provide a compound containing titanium, magnesium and chlorine. The titanium content of the compound thus formed was 20.0% by weight.

(2) Production of Polyethylene

A mixture of 400 milliliters of dried n-hexane, 2.0 millimoles of triisobutylaluminum as Component (B) and 0.0025 millimole, calculated as titanium, of the compound prepared in (1) above was introduced into a 1-liter stainless steel autoclave and the mixture brought to 80° C. Subsequently, hydrogen and ethylene were introduced under pressure into the autoclave so that hydrogen and ethylene partial pressures were 2 kg/cm$^2$ and 6 kg/cm$^2$, respectively. Thereafter, while continuously introducing ethylene so as to maintain the foregoing partial pressure, polymerization of ethylene was conducted at 80° C. for 1 hour. At the end of that time, unreacted gases were removed, and the polymer formed was separated and dried. Thus, 5 grams of white polyethylene was obtained.

The apparent density of the polyethylene thus formed was 0.20 g/cm$^3$, and $MI_{2.16}$ and F.R. were 0.50 and 33, respectively.

EXAMPLE 6

(1) Compound containing at least titanium, magnesium and halogen

A mixture of 150 milliliters of dried n-hexane, 10.0 grams (88 millimoles) of magnesium diethoxide and 3.7 grams (22 millimoles) of silicon tetrachloride was introduced into a 500 milliliters four-necked flask, and 2.0 grams (33 millimoles) of isopropyl alcohol was dropwise added thereto over a period of 30 minutes while stirring at 20° C. The mixture was heated up and reacted under reflux for 3 hours. Then, 42 grams (200 millimoles) of titanium tetrachloride was dropwise added to the reaction mixture, and the reaction was continued for an additional three hours under reflux with stirring. After the reaction was completed, the reaction mixture was cooled down and allowed to stand. The supernatant liquid was removed, and the solid material formed was washed with n-hexane to provide the desired compound containing titanium, magnesium and halogen. The titanium content of the compound thus formed was 6.2% by weight.

(2) Preparation of Component (A) of Catalyst

Into a 200 milliliters flask were introduced 50 milliliters of dried n-hexane, 8.8 millimoles, calculated as magnesium, (or 1.3 millimoles, calculated as titanium) of the compound prepared in (1) above, and furthermore 3 millimoles of tetrabutoxyzirconium which were then reacted at 70° C. for 2 hours with stirring. Subsequently, the reaction mixture was cooled to room temperature and was allowed to stand. The supernatant liquid was removed. The precipitate formed was washed once with 50 milliliters of n-hexane. Subsequently, 8.8 millimoles of titanium tetrachloride was added thereto, and they were reacted at 70° C. for 3 hours. The reaction mixture was cooled, and the precipitate formed was washed five times with 50 milliliters of n-hexane to provide a solid product of Component (A).

(3) Production of Polyethylene

A mixture of 400 milliliters of dried n-hexane, 2.0 millimoles of triisobutylaluminum as Component (B), and 0.005 millimoles, calculated as titanium, of the solid product of Component (A) prepared in (2) above was introduced into a 1-liter stainless steel autoclave and the mixture was heated up to 80° C. Subsequently, hydrogen and ethylene were introduced under pressure into the autoclave so that hydrogen and ethylene partial pressures were 2 kg/cm$^2$ and 6 kg/cm$^2$, respectively. Thereafter, while continuously introducing ethylene so as to maintain the foregoing ethylene partial pressure, polymerization of ethylene was conducted at 80° C. for 1 hour. At the end of that time, unreacted gases were removed, and the polymer formed was separated and dried. Thus, 139 grams of white polyethylene was obtained.

The apparent density of the polyethylene thus produced was 0.29 g/cm$^3$, and MI$_{2.16}$ and F.R. were 0.52 and 46, respectively.

EXAMPLE 7

(1) Preparation of Component (A) of Catalyst

Into a 200 milliliters flask were introduced 8.8 millimoles, calculated as magnesium, (or 1.3 millimoles, calculated as titanium) of the compound prepared in (1) of Example 6, 1.0 millimole of tetrabutoxyzirconium, and 50 milliliters of dried n-hexane which were then reacted at 70° C. for 2 hours with stirring. Subsequently, 22 millimoles of titanium tetrachloride was added thereto, and they were reacted at 70° C. at 3 hours. The reaction mixture was cooled. The precipitate formed was washed five times with 50 milliliters of n-hexane to provide a solid product of Component (A).

(2) Production of Polyethylene

In the same manner as in Example 6, except that the solid produce prepared in (1) above was used as Component (A), ethylene was polymerized to provide 84 grams of polyethylene.

The apparent density of the polyethylene thus formed was 0.27 g/cm$^3$, and MI$_{2.16}$ and F.R. were 0.41 and 46, respectively.

EXAMPLE 8

(1) Preparation of Component (A) of Catalyst

Into a 200 milliliters flask were introduced 8.8 millimoles, calculated as magnesium, (or 1.3 millimoles, calculated as titanium) of the compound prepared in (1) of Example 6, 2.0 millimoles of tetrabutoxyzirconium, 2.0 millimoles of zirconium tetrachloride and 50 milliliters of dried n-hexane which were then reacted at 70° C. for 3 hours with stirring. Subsequently, 22 millimoles of titanium tetrachloride was added thereto, and they were reacted at 70° C. for 3 hours. The reaction mixture was cooled down and was allowed to stand. The supernatant liquid was removed, and the precipitate formed was washed five times with 50 milliliters of n-hexane to provide a solid product of Component (A).

(2) Production of Polyethylene

A mixture of 400 milliliters of dried n-hexane, 2.0 millimoles of triisobutylaluminum as Component (B) and 0.01 millimole, calculated as titanium, of the solid product of Component (A) prepared in (1) above was introduced into a 1-liter stainless steel autoclave and the mixture was heated up to 80° C. Subsequently, hydrogen and ethylene were introduced under pressure into the autoclave so that hydrogen and ethylene partial pressures were 3 kg/cm$^2$ and 5 kg/cm$^2$, respectively. Thereafter, while continuously introducing ethylene so as to maintain the foregoing partial pressure, polymerization of ethylene was conducted at 80° C. for 1 hour. At the end of that time, unreacted gases were removed, and the polymer formed was separated and dried. Thus, 105 grams of white polyethylene was obtained.

The apparent density of the polyethylene thus produced was 0.25 g/cm$^3$, and MI$_{2.16}$ and F.R. were 0.38 and 54, respectively.

EXAMPLE 9

(1) Preparation of Component (A) of Catalyst

Into a 200 milliliters flask were introduced 8.8 millimoles, calculated as magnesium, (or 1.3 millimoles, calculated as titanium) of the compound prepared in (1) of Example 6, 44 millimoles of ethylaluminum dichloride, and 50 milliliters of dried n-hexane which were then reacted at 70° C. for 1 hour with stirring. The reaction mixture was cooled and was allowed to stand. The supernatant liquid was removed, and the precipitate formed was washed with dried n-hexane. Subsequently, 50 milliliters of dried n-hexane was added to the solid slurry as formed above, and 4.0 millimoles of tetrabutoxyzirconium was added thereto. The mixture was reacted at 70° C. for 3 hours. Furthermore, 22 millimoles of titanium tetrachloride was added to the reaction mixture as formed above and was reacted at 70° C. for 3 hours. The reaction mixture was cooled and allowed to stand. The supernatant liquid was removed, and the precipitate formed was washed with dried n-hexane to provide a solid product of Component (A).

(2) Production of Polyethylene

A mixture of 400 milliliters of dried n-hexane, 2.0 millimoles of triisobutylaluminum as Component (B), and 0.005 millimoles, calculated as titanium, of the solid product prepared in (1) above was placed in a 1-liter stainless steel autoclave and the mixture was heated up to 80° C. Subsequently, hydrogen and ethylene were introduced under pressure into the autoclave so that hydrogen and ethylene partial pressures were 2 kg/cm$^2$ and 6 kg/cm$^2$, respectively. Thereafter, while continuously introducing ethylene so as to maintain the foregoing partial pressure, polymerization of ethylene was conducted at 80° C. for 1 hour. At the end of the time, unreacted gases were removed, and the polymer formed was separated and dried. Thus, 225 gram of white polyethylene was obtained.

The apparent density of the polyethylene thus produced was 0.29 g/cm$^2$, and MI$_{2.16}$ and F.R. were 0.50 and 31, respectively.

We claim:

1. A process for the production of polyethylene characterized by using a catalyst consisting of the following components (A) and (B)

(A) a solid product prepared by reacting the reaction product of (i) a compound containing titanium, magnesium and halogen, and (ii) at least one compound selected from the group consisting of tetraalkoxyzirconium, zirconium tetrahalide and tetraalkoxytitanium, with an organoaluminum halide compound of the general formula: AlR$^1_n$X$^1_{3-n}$ wherein R$^1$ is an alkyl group, X$^1$ is a halogen atom, and $0 < n < 3$ or a halogen-containing titanium compound of the general formula Ti(OR$^2$)$_m$X$^2_{4-m}$, wherein R$^2$ is an alkyl group, X$^2$ is a halogen atom, and $0 \leq m < 4$; and (B) an organoaluminum compound;

said compound (i) containing titanium, magnesium and halogen being prepared by reacting a magnesium dialkoxy compound with a silicon halide, an alcohol and a titanium halide in that sequence.

2. The process of claim 1 wherein the organoaluminum compound of Component (B) is of the general formula AlR$^3_k$X$^3_{3-k}$, wherein R$^3$ is an alkyl group, X$^3$ is a halogen atom, and $0 < k \leq 3$; or of the general formula AlR$^4_i$(OR$^5$)$_{3-i}$, wherein R$^4$ and R$^5$ are each an alkyl group, and $0 < i \leq 3$.

3. The process of claim 2 containing from about 1 to 200 moles of said organoaluminum halide compound or said halogen-containing titanium compound per mole of the titanium atoms in said compound containing titanium, magnesium and halogen; and when said component (A) (ii) is a tetraalkoxyzirconium, an amount thereof from about 0.1 to 20 moles and when said component (A) (ii) is a zirconium tetrahalide or tetraalkoxytitanium, an amount up to about 20 moles, based on one mole of said titanium atom; and containing said component (B) in an amount of about 1 to 1,000 moles per mole of said titanium atom.

4. The process of claim 3 containing from about 10 to 100 moles of said organoaluminum halide compound or said halogen-containing titanium compound per mole of the titanium atoms in said compound containing titanium, magnesium and halogen; and when said component (A) (ii) is a tetraalkoxyzirconium, an amount thereof from about 0.2 to 10 moles and when said component (A) (ii) is a zirconium tetrahalide or tetraalkoxytitanium, an amount from about 0.5 to 10 moles, based on one mole of said titanium atom; and containing said component (B) in an amount of about 10 to 500 moles per mole of said titanium atom.

5. The process of claim 4 wherein when said component (A) contains an organoaluminum halide compound, said organoaluminum halide compound is at least one compound selected from the group consisting of dimethylaluminum monochloride, diethylaluminum monochloride, diisopropylaluminum monochloride, diisobutylaluminum monochloride, methylaluminum dichloride, ethylaluminum dichloride, isopropylaluminum dichloride, and isobutylaluminum dichloride; and wherein when said component (A) contains a halogen-containing titanium compound, said halogen-containing compound is at least one compound selected from the group consisting of $TiCl_4$, $TiBr_4$, $Ti(OCH_3)Cl_3$, $Ti(OC_2H_5)_2Cl_2$, and $Ti(OC_2H_5)_3Cl$.

6. The process of claim 5 said component (B) is at least one compound selected from the group consisting of trimethylaluminum, triethylaluminum, triisopropylaluminum, triisobutylaluminum, diethylaluminum monochloride, diisopropylaluminum monochloride, diisobutylaluminum monochloride, dioctylaluminum monochloride, ethylaluminum dichloride, diethylaluminum monoethoxide, isopropylaluminum dichloride and ethylaluminum sesquichloride.

7. The process of claim 5 wherein said halogen atoms are chloride.

8. The process of claim 5 wherein said halogen atoms are bromide.

9. The process of claim 2 wherein said halogen atoms are chloride.

10. The process of claim 2 wherein said halogen atoms are bromide.

11. The process of any one of claims 1, 2, 3, 4, 5, 6, 7, 8, 9, or 10, wherein said magnesium dialkoxy compound which is reacted with said silicon halide, alcohol and a titanium halide is magnesium diethoxide.

* * * * *